Sept. 26, 1944.    B. D. ASHBAUGH    2,358,956

FEEDING UNIT FOR INJECTION MOLDING MACHINES

Filed Dec. 6, 1941

Inventor
BERNARD D. ASHBAUGH,
By Toulmin & Toulmin
Attorneys

Patented Sept. 26, 1944

2,358,956

UNITED STATES PATENT OFFICE 2,358,956

FEEDING UNIT FOR INJECTION MOLDING MACHINES

Bernard D. Ashbaugh, Mount Gilead, Ohio, assignor to The Hydraulic Development Corp., Inc., Wilmington, Del., a corporation of Delaware Application December 6, 1941, Serial No. 421,857

1 Claim. (Cl. 18—30)

This invention relates to plastic injection machines and particularly to apparatus for feeding granular plastic material into the injection chamber by a gravity flow.

An object of the invention is to provide an apparatus for feeding granular plastic material into the injection chamber of the plastic injection machine during the return stroke of the injection plunger so that an accurate charge of granular plastic material will be fed into the injection cylinder upon each cycle of operation of the injection machine.

Another object of the invention is to provide a feeding apparatus for a plastic injection machine which measures a charge of granular material during the injection stroke of the injection machine.

Another object of the invention is to provide a feeding apparatus for feeding granular plastic material to the injection chamber of an injection machine wherein the feeding apparatus measures the quantity of granular plastic material during the injection stroke of the machine and proportions the measured quantity of plastic material to the quantity of material ejected from the injection cylinder.

Another object of the invention is to provide a feeding apparatus for a plastic injection machine which feeds granular plastic material into the injection chamber of the injection machine during the retraction stroke of the injection plunger in a manner that the granular material begins to enter the injection chamber when the injection plunger uncovers a feed opening between the injection cylinder and the feeding apparatus.

Another object of the invention is to provide a gravity feed for granular plastic material constructed and arranged in a manner that the granular plastic material is directed forwardly into the injection chamber when moving thereinto by gravity, whereby a more accurate charge of granular material is fed into the injection cylinder upon each cycle of operation of the injection machine.

Another object of the invention is to proportion the size of the injection cylinder to the size of the measuring chamber of the feeding apparatus for the injection machine so that the quantity of granular plastic material measured by the feeding apparatus is equal to the quantity of compressed plastic material ejected from the injection cylinder.

Another object of the invention is to provide a plastic injection machine having a feeding apparatus of the gravity type which is constructed and arranged in a manner that the measurement of a charge of granular plastic material is started at the instant plasticized material in the injection chamber begins ejecting from the injection chamber, and wherein the charge of granular plastic material measured by the feeding mechanism during the injection stroke of the injection machine is fed by gravity into the injection chamber starting with the instant the injection plunger uncovers the feed opening for the injection cylinder during the retraction stroke of the injection plunger.

Another object of the invention is to provide a method for feeding granular plastic material by gravity to the injection cylinder of an injection machine so that a complete measured charge of granular plastic material is fed into the injection cylinder upon each cycle of operation of the cylinder.

Another object of the invention is to provide a method of feeding granular plastic material by gravity into the injection cylinder so that the quantity of material fed into the cylinder is in proportion to the stroke of the injection plunger after the plunger begins to eject plasticized material from the injection cylinder.

Further objects and advantages will become apparent from the drawing and the following description.

Figure 1:
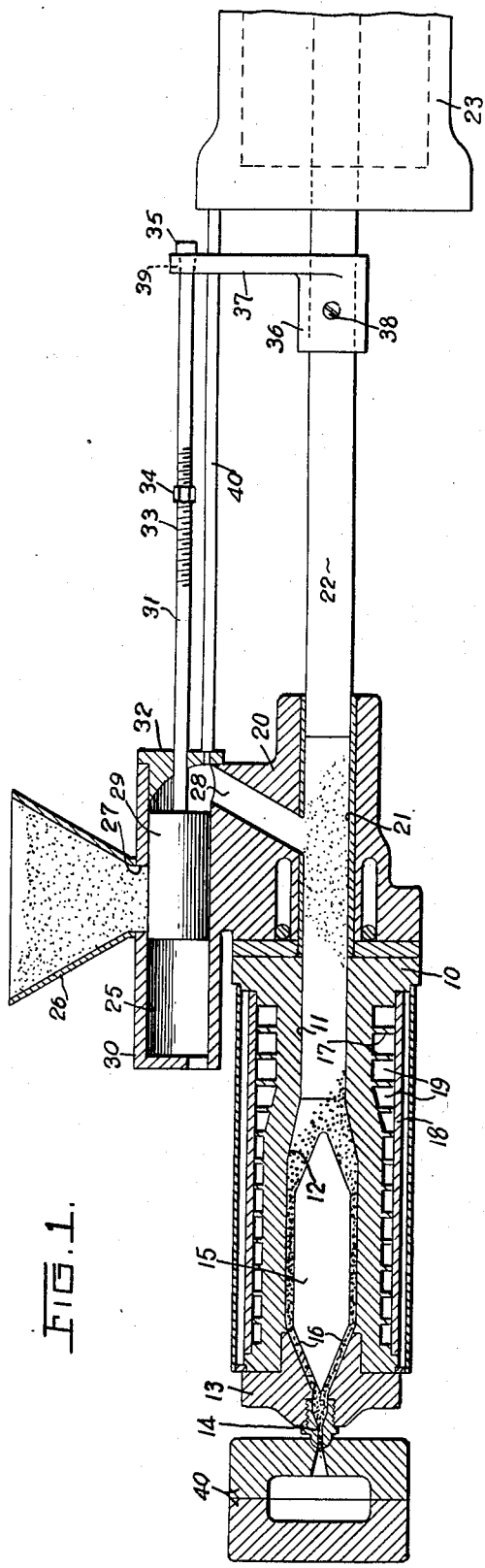
Figure 1 is a longitudinal cross-sectional view, somewhat schematic, of a plastic injection machine incorporating features of this invention wherein a charge of plastic material has just been fed into the injection cylinder.

In prior plastic injection machines considerable expensive equipment has been provided for accurately controlling the quantity of granular plastic material fed into the plastic injection machine to insure feeding a predetermined quantity of material into the injection cylinder after each injection stroke of the injection machine. To insure substantial accuracy of the quantity of material fed into the injection cylinder pressure acting force-feed screws have been used which were driven by a suitable power source for a determined time interval at the injection of each injection cycle.

The applicant, in this invention, avoids the necessity of the previous expensive equipment and complicated apparatus and depends solely upon gravity movement of the granular plastic material to feed an accurate predetermined charge of the material into the injection cylinder at the end of each cycle of operation of the injection machine. The applicant is able to feed an accurate quantity of granular plastic material since he takes advantage of the force developed by the normal gravity fall of a body of material to direct the material into the injection chamber of the injection machine.

In this invention the injection machine consists of an injection cylinder 10 having a cylindrical bore 11 therein forming a material receiving chamber. An enlarged bore 12 is provided in the injection cylinder 10 and is coaxial with the bore 11. An injection nozzle 13 is removably secured within the end of the enlarged bore 12 and has a nozzle orifice 14 therein through which plasticized material is ejected from the bore 12. The injection nozzle 13 has a cylindrical member 15 extending therefrom into the enlarged bore 12 forming a torpedo for directing the plastic material into the enlarged bore 12 into coaxial thermal contact with the bore 12 during the passage of the plastic material between the torpedo 15 and the bore 12. A plurality of passages 16 is disposed angularly with respect to the axis of the injection nozzle 13 to communicate with the passage between the torpedo 15 and the bore 12. The passages 16 converge into the nozzle orifice 4.

The injection cylinder 10 has a spiral fin 17 extending from the outer surface thereof and along the length of the cylinder 10. A sleeve 18 surrounds the injection cylinder 10 and engages the outer edges of the fins 17 thereby forming, in cooperation with the fins 17, a continuous passageway 19 extending from one end of the cylinder to the opposite end thereof.

A suitable inlet and outlet are provided for the passage 19 for conducting a heating fluid to and from the passage 19 and thereby provide a source of heat for plasticizing the granular plastic material within the injection cylinder bores 11 and 12. The heating fluid circulated through the passageway 19 has the temperature thereof controlled in any suitable manner as is conventional in the plastic machine art whereby the degree of heat absorbed by the plastic material within the injection cylinder may be accurately controlled.

The feeding apparatus associated with the injection cylinder of this invention consists of a body 20 suitably secured to the injection cylinder 10 and having a bore 21 therein which is of the same diameter as the bore in the injection cylinder 10. An injection plunger 22 slidably engages the bore 21 in the body 20 for moving granular plastic material into the material receiving chamber 11 of the injection cylinder 10 and for ejecting plasticized material through the injection orifice 14. The injection plunger 22 extends within the cylinder 23 of a hydraulic motor and connects to the piston 24 of the hydraulic motor. Suitable passageways are provided in the opposite ends of the hydraulic motor cylinder 23 for admitting fluid to opposite ends of the piston 24 to reciprocate the same within the cylinder 23 and thereby reciprocate the injection plunger 22 within the injection cylinder 10.

The body 20 is provided with a cylinder 30 having a cylinder bore 25 forming the material receiving chamber within which calibrated charges of granular plastic material are fed from a hopper 26. The hopper 26 communicates with a feed opening 27 provided in the cylinder 30. The material receiving bore 25 of the cylinder 30 is connected with the bore 21 in the body 20 by means of an angularly disposed chute 28. The chute 28 is positioned on a forwardly directed angle with respect to the forward end of the injection cylinder 10 so that granular plastic material which enters the chute 28 from the material receiving bore 25 will be thrown forwardly into the injection cylinder bore 21, 11.

A piston 29 is slidably positioned within the cylinder 30 and has a plunger rod 31 extending rearwardly therefrom through the end wall 32 of the cylinder 30. The plunger 31 has a threaded portion 33 to receive an adjusting nut 34. An enlarged head 35 is secured to the end of the plunger 31.

The injection plunger 22 carries a sleeve 36 having an arm 37 extending upwardly therefrom. The sleeve 36 is secured to the plunger 22 by means of the fastening screw 38. The arm 37 is provided with a hole 39 through the upper end thereof to receive the plunger 31 which extends therethrough. The arm 37 is adapted to reciprocate the piston 29 within the cylinder 30 by engagement of the adjusting nut 34 or the enlarged head 35 during certain portions of the cycle of operation of the injection machine to be hereinafter more fully described.

A guide rod 40 extends between the injection cylinder 30 and the hydraulic motor 23 for guiding movement of the arm 37 during its reciprocatory motion.

It is of course understood that the hydraulic motor 23 has suitable strain rods for connecting the same to the injection cylinder 10 or to the main press frame so that the injection plunger 22 can reciprocate within the injection cylinder 10.

A suitable mold 41 is associated with the injection nozzle 13 to receive the plastic material ejected from the enlarged bore 12 of the injection cylinder 10.

The operation of the device is as follows. As shown in Figure 1, the plastic injection machine is in the position representing the completion of a retraction stroke of the injection plunger 22 and the completion of feeding a predetermined charge of granular plastic material into the material receiving bore 21. With the machine in this position an injection stroke can be started. Hydraulic fluid will be admitted to the hydraulic motor cylinder 23 to move the injection plunger in a leftward direction as viewed in Figure 1. Suitable automatic or manual controls can be provided for controlling the flow of hydraulic fluid to the hydraulic motor cylinder. These controls are all well known in the art of plastic injection machines and since they do not form a specific part of this invention it is not believed further discussion is necessary as to any particular type of automatic or manual control for the hydraulic motor 23.

The plastic material which has been fed into the material receiving bore 21 is still in a granular condition and when the plunger 22 moves in a leftward direction the granular plastic material will be transferred from the material receiving bore 21 into the material receiving bore 11 of the injection cylinder 10 so that it can be heated to a plasticized condition.

As the injection plunger 22 moves in its leftward direction the arm 37 is carried along the plunger rod 31 without causing any movement of the piston 29 in its cylinder 30. The adjusting nut 34 is located upon the rod 31 so the arm 37 will engage the nut 34 and move the piston 29 within the cylinder 30 to bring the righthand edge of the piston 29 adjacent the righthand edge of the feed opening 27 at the instant plasticized material begins ejecting from the nozzle or orifice 14 into the mold 41 caused by the injection plunger 22. From this point in the injection stroke the quantity of granular material fed from the hopper 26 into the material receiving bore 25 of the cylinder 30 will be in direct proportion to the quantity of plasticized material being ejected from the enlarged bore 12 of the cylinder 10 so that when the injection stroke is completed a measured charge of granular plastic material has fallen into the material receiving chamber 25 which is equal to the quantity of plasticized material ejected from the bore 12 of the cylinder 10.

Figure 2:
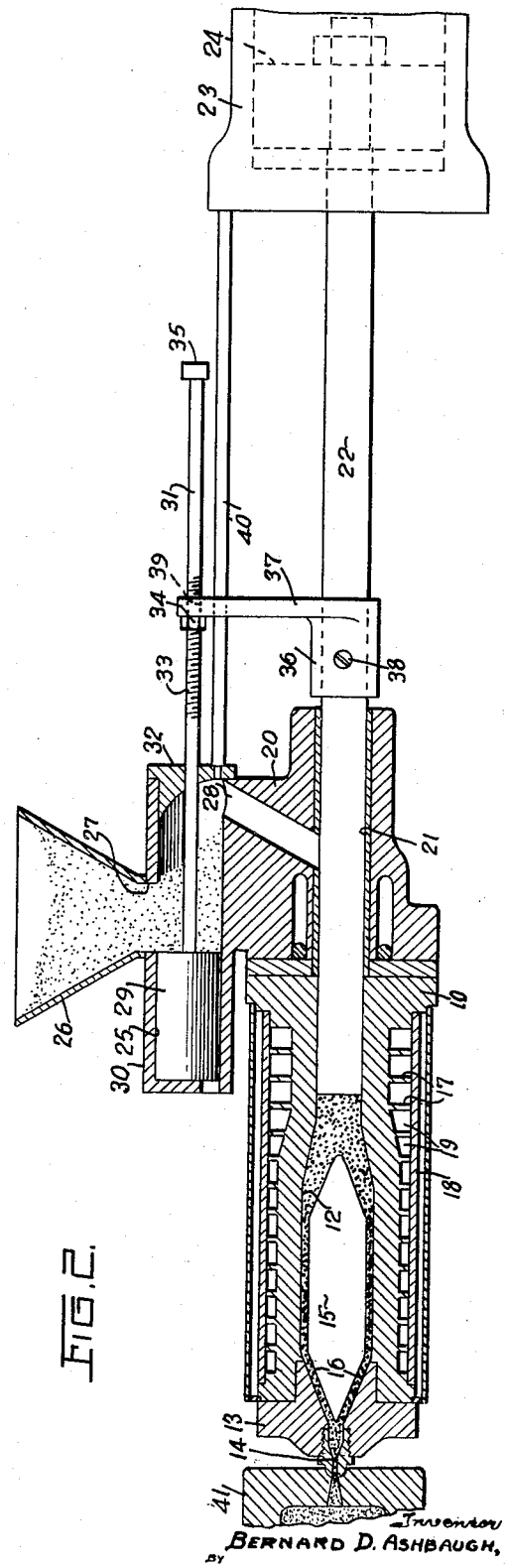
Figure 2 is a longitudinal cross-sectional view similar to Figure 1 but shows the injection machine at the end of an injection stroke.

At the end of the injection stroke, and if the injection plunger has taken a complete stroke, the position of the machine will be as shown in Figure 2. The machine is now ready for a retraction stroke. Hydraulic fluid is admitted to the hydraulic motor cylinder 23 on the lefthand side of the piston 24 to thereby retract the injection plunger 22 from within the injection cylinder 10. The initial movement of the injection plunger 22 does not cause any movement of the piston 29 within the cylinder 30 since the arm 37 is freely movable along the plunger rod 31 until it strikes the enlarged head 35. The arm 37 strikes the enlarged head 35 at the instant the end of the plunger begins to uncover the lefthand edge of the chute 28 so that from this point in the cycle the piston 29 will be moved simultaneously with the injection plunger 22. Movement of the piston 29 in a rightward direction causes the granular plastic material to fall into the chute 28 and since the injection plunger 22 is uncovering the lower end of the chute 28 the granular plastic material is permitted to immediately enter the material receiving chamber 21. Further, since the chute 28 is positioned at a forwardly directed angle the granular plastic material will be given a forward motion tending to throw the material forwardly in the material receiving bore or chamber 21. Advantage is thereby taken of the gravity fall of the granular plastic material to cause the same to advance into the material receiving chamber 21 as far as possible, thereby insuring entry of the complete charge of granular plastic material into the material receiving chamber 21. The piston 29 is moved in a rightward direction until the completion of the retraction stroke of the plunger 22, at which time the machine will again be in the position shown in Figure 1 and the material receiving chamber 25 will be completely emptied of granular plastic material.

Since the granular plastic material is fed into the material receiving chamber 21 during the retraction stroke of the plunger 22, the plastic material has complete freedom of movement through the chute 28 and the material receiving chamber 21.

If plastic material should gradually collect within the injection cylinder 10 due to the fact that the feeding apparatus is over feeding slightly, the stroke of the injection plunger will become less and thus the stroke of the piston 29 will become less. If the piston 29 is not moved completely in a leftward direction, as shown in Figure 2, but partially closes the opening 27 in the hopper 26 there will not be a full measured charge within the material receiving chamber 25 so that upon the next retraction stroke of the plunger 22 a smaller charge of granular material is thrown into the material receiving chamber 21. Thus, the feeding apparatus is self-compensating to regulate the quantity of granular plastic material fed into the injection cylinder in proportion to the quantity of material ejected from the injection cylinder.

It is of course recognized that a predetermined ounce quantity of granular material fills a larger area than the same ounce quantity of compressed and plasticized material. Therefore, the size of the material receiving chamber 25 must be proportioned to the size of the material receiving chamber 21. The average compression ratio of the plastic material is 2.4, and the specific volume of the compressed plasticized material is 1.312 cubic inches per ounce. The compression ratio being 2.4 the volume of space occupied by the granular plastic material will be 2.4 times the volume of compressed plasticized material to equal the same ounce quantity. Assuming that the piston 29 and the plunger 22 move the same distance after material begins flowing from the nozzle orifice 14, it can be seen that the material receiving chamber 25 must be 2.4 times as large as the material receiving chamber 21, which chamber 21 is the same size as the injection cylinder heating chamber 11.

If the piston 29 begins to uncover the port 27 from the hopper 26 at the instant material begins to flow from the nozzle orifice 14 it can readily be seen that the ounce quantity of material permitted to fall into the material receiving chamber 25 will be directly proportioned to the ounce quantity of compressed plasticized material being ejected from the injection cylinder 11 by means of the injection plunger 22.

The piston 29 moves within the material receiving chamber 25 to the same position upon each retraction stroke of the injection plunger. Therefore, the granular plastic material admitted into the material receiving chamber 25 will be completely discharged at the end of each retraction stroke of the injection cylinder to insure that the accurately measured charge is all directed into the material receiving chamber 21.

By moving the piston 29 and the plunger 22 forward concomitantly during that portion of the injection cycle in which material is ejected from the injection cylinder and by proportioning the size of the material receiving chambers 25 and 21 the feeding mechanism is automatically self-compensating for varying strokes of the injection plunger caused by production variables.

Having thus fully described my invention what I claim as new and desire to secure by Letters Patent, is:

In an injection machine an injection cylinder, an injection plunger reciprocable therein, a granular plastic material receiving hopper disposed adjacent said cylinder, a stationary material receiving chamber associated with said hopper having an opening therein through which material can pass from said hopper to said chamber, valve means in said chamber displaceable from one end toward the other thereof for regulating the volume of an unoccupied portion of the chamber at one end thereof and for opening and closing said opening, said valve means consisting of a second plunger having a closed peripheral portion which slides beneath said hopper opening, a material conducting passage connecting the said unoccupied portion of said chamber with said injection cylinder having the inlet end thereof disposed out of alignment with said opening to prevent direct gravity flow of plastic material from said hopper through said chamber and into said passage to thereby prevent overcharging plastic material into said cylinder the outlet end of said passage adapted to be covered and uncovered by said injection plunger during reciprocation thereof, and means interconnecting said injection plunger and said second plunger for moving said second plunger in one direction to open said hopper opening while said plunger ejects material from said injection cylinder to permit a controlled quantity of material to flow from said hopper into said chamber and be retained therein and for moving said second plunger in the opposite direction to move the granular plastic material from said chamber into said passage coincident with the uncovering of said passage by said injection plunger to permit free gravity flow of said granular material into said injection cylinder.

BERNARD D. ASHBAUGH.